US011153492B2

(12) United States Patent
Hutsler et al.

(10) Patent No.: US 11,153,492 B2
(45) Date of Patent: Oct. 19, 2021

(54) SELECTING SPECTATOR VIEWPOINTS IN VOLUMETRIC VIDEO PRESENTATIONS OF LIVE EVENTS

(71) Applicant: AT&T Intellectual Property I, L.P., Atlanta, GA (US)

(72) Inventors: Molly Hutsler, Cumming, GA (US); Eric Zavesky, Austin, TX (US); Timothy Henderson, Roswell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 206 days.

(21) Appl. No.: 16/385,538

(22) Filed: Apr. 16, 2019

(65) Prior Publication Data

US 2020/0336668 A1 Oct. 22, 2020

(51) Int. Cl.
*G06K 9/00* (2006.01)
*H04N 5/232* (2006.01)
(Continued)

(52) U.S. Cl.
CPC ..... *H04N 5/23299* (2018.08); *G06K 9/00671* (2013.01); *G06K 9/00711* (2013.01);
(Continued)

(58) Field of Classification Search
CPC ..... G06K 2009/00738; G06K 2209/21; G06K 9/00671; G06K 9/00711; H04N 13/167;
(Continued)

(56) References Cited

U.S. PATENT DOCUMENTS 5,850,352 A   12/1998 Moezzi et al.
7,448,063 B2  11/2008 Freeman et al.
(Continued)

FOREIGN PATENT DOCUMENTS

JP   2016099941 A    5/2016
WO   2007124664 A1   11/2007
(Continued)

OTHER PUBLICATIONS

Stancil, Brian A., Cha Zhang, and Tsuhan Chen. "Active multicamera networks: From rendering to surveillance." IEEE Journal of selected topics in signal processing 24 (2008): 597-605. http://chenlab.ece.cornell.edu/Publication/Brian/stancil_DPVN2008.pdf.
(Continued)

*Primary Examiner* — William C Vaughn, Jr.
*Assistant Examiner* — Naod W Belai

(57) ABSTRACT

A method for selecting spectator viewpoints in volumetric video presentations of live events includes receiving a plurality of video streams depicting an event occurring in a venue, wherein the plurality of video streams are provided to a processor by a plurality of cameras which are geographically distributed within the venue, identifying an initial position of a target that is present in the venue, based on an analysis of the plurality of video streams, compositing the plurality of video streams to produce a first volumetric video traversal of the live event that follows the target through the venue, predicting a future position of the target in the venue at a future point in time, based in part on a current position of the target, and sending an alert to a display device that is streaming a volumetric video presentation of the event, wherein the alert indicates the future position of the target.

20 Claims, 3 Drawing Sheets

(51) Int. Cl.
    *H04N 13/388* (2018.01)
    *H04N 5/247* (2006.01)
    *H04N 13/167* (2018.01)

(52) U.S. Cl.
    CPC ........... *H04N 5/247* (2013.01); *H04N 13/167* (2018.05); *H04N 13/388* (2018.05); *G06K 2009/00738* (2013.01); *G06K 2209/21* (2013.01)

(58) Field of Classification Search
    CPC ... H04N 13/388; H04N 5/23299; H04N 5/247
    See application file for complete search history.

(56) References Cited

U.S. PATENT DOCUMENTS

| | | |
|---|---|---|
| 7,593,602 B2 | 9/2009 | Stentiford |
| 7,778,445 B2 | 8/2010 | Au et al. |
| 7,830,381 B2 | 11/2010 | Lundström et al. |
| 7,944,454 B2 | 5/2011 | Zhou et al. |
| 8,009,864 B2 | 8/2011 | Linaker et al. |
| 8,477,154 B2 | 7/2013 | Davis et al. |
| 8,477,998 B1 | 7/2013 | Kim et al. |
| 8,488,877 B1 | 7/2013 | Owechko et al. |
| 8,705,876 B2 | 4/2014 | Vaddadi et al. |
| 8,755,610 B2 | 6/2014 | Holland et al. |
| 8,964,008 B2 | 2/2015 | Bathiche |
| 9,064,309 B2 | 6/2015 | Chaudhury et al. |
| 9,153,073 B2 | 10/2015 | Langlotz et al. |
| 9,185,361 B2 | 11/2015 | Curry |
| 9,196,021 B2 | 11/2015 | Jin et al. |
| 9,214,030 B2 | 12/2015 | Sole et al. |
| 9,258,531 B2 | 2/2016 | Jia et al. |
| 9,361,727 B2 | 6/2016 | Fuchs et al. |
| 9,363,569 B1 | 6/2016 | Van Hoff et al. |
| 9,406,131 B2 | 8/2016 | Würmlin et al. |
| 9,449,230 B2 | 9/2016 | Han et al. |
| 9,495,764 B1 | 11/2016 | Boardman et al. |
| 9,591,336 B2 | 3/2017 | Cronin et al. |
| 9,794,495 B1 | 10/2017 | Forsblom |
| 9,836,885 B1 | 12/2017 | Eraker et al. |
| 9,918,110 B2 | 3/2018 | Anwar et al. |
| 9,922,404 B2 | 3/2018 | Lee et al. |
| 9,940,898 B2 | 4/2018 | Cook et al. |
| 9,947,108 B1 | 4/2018 | Chen |
| 9,973,711 B2 | 5/2018 | Yang et al. |
| 9,986,221 B2 | 5/2018 | Zhou |
| 10,127,643 B2 | 11/2018 | Lee et al. |
| 2003/0023974 A1 | 1/2003 | Dagtas et al. |
| 2008/0246759 A1 | 10/2008 | Summers |
| 2015/0104065 A1 | 4/2015 | Park et al. |
| 2015/0226828 A1 | 8/2015 | Davies et al. |
| 2016/0198140 A1 | 7/2016 | Nadler |
| 2016/0335748 A1 | 11/2016 | Newson et al. |
| 2017/0061686 A1 | 3/2017 | Yu |
| 2017/0180680 A1 | 6/2017 | Yu |
| 2017/0195561 A1 | 7/2017 | Hegelich et al. |
| 2017/0244948 A1 | 8/2017 | Pang et al. |
| 2017/0244985 A1 | 8/2017 | Masterson |
| 2017/0318275 A1 | 11/2017 | Khalid et al. |
| 2017/0339341 A1 | 11/2017 | Zhou et al. |
| 2018/0063514 A1 | 3/2018 | Mizuno |
| 2018/0098131 A1 | 4/2018 | Zhou |
| 2018/0131907 A1 | 5/2018 | Schmirler et al. |
| 2018/0146216 A1 | 5/2018 | Chang et al. |
| 2018/0164593 A1 | 6/2018 | Van der Auwera et al. |
| 2018/0173957 A1 | 6/2018 | Pavetic et al. |
| 2018/0213202 A1 | 7/2018 | Kopeinigg et al. |
| 2018/0220048 A1 | 8/2018 | Tamir et al. |
| 2018/0253884 A1 | 9/2018 | Burnett, III et al. |
| 2018/0255332 A1 | 9/2018 | Heusser |
| 2018/0302602 A1 | 10/2018 | Chen et al. |
| 2018/0332218 A1 | 11/2018 | Yoshimura |
| 2018/0336687 A1* | 11/2018 | Mudretsov ......... G06K 9/00288 |
| 2018/0342043 A1 | 11/2018 | Vandrotti et al. |
| 2018/0342106 A1 | 11/2018 | Rosado |
| 2018/0343387 A1 | 11/2018 | Bostick et al. |
| 2018/0350146 A1 | 12/2018 | Gervasio et al. |
| 2018/0359489 A1 | 12/2018 | Lakshman et al. |
| 2018/0376217 A1* | 12/2018 | Kahng ................. H04N 13/117 |
| 2019/0012844 A1 | 1/2019 | Rao et al. |
| 2019/0051037 A1 | 2/2019 | Chui et al. |
| 2020/0202608 A1* | 6/2020 | Mekuria ............. H04L 65/4084 |

FOREIGN PATENT DOCUMENTS

| | | |
|---|---|---|
| WO | 2016029224 A1 | 2/2016 |
| WO | 2017186649 A1 | 11/2017 |
| WO | 2017201751 A1 | 11/2017 |
| WO | 2017205642 A1 | 11/2017 |
| WO | 2018036456 A1 | 3/2018 |
| WO | 2018039646 A1 | 3/2018 |
| WO | 2018055340 A1 | 3/2018 |
| WO | 201810338 A1 | 6/2018 |
| WO | 2018144315 A1 | 8/2018 |
| WO | 2018175855 A1 | 9/2018 |

OTHER PUBLICATIONS

Ballan, Luca, et al. "Unstructured video-based rendering: Interactive exploration of casually captured videos." ACM Transactions on Graphics (TOG). vol. 29. No. 4. ACM, 2010. ftp://ftp.idc.ac.il/Faculty/arik/Seminar2010/papers/VideoDepictions/videoExploration.pdf.

Varayanan, P. J., Peter W. Rander, and Takeo Kanade. "Constructing virtual worlds using dense stereo." IEEE, 1998. https://www.researchgate.net/profile/Peter_Rander/publication/3766361_Constructing_virtual_worlds_using_dense_stereo/links/55fa9fb808ae07629e0417dc/Constructing-virtual-worlds-using-dense-stereo.pdf.

Possegger, Horst, et al., "Robust real-time tracking of multiple objects by volumetric mass densities," Proceedings of the IEEE Conference on Computer Vision and Pattern Recognition. 2013. http://citeseerx.ist.psu.edu/viewdoc/download?doi=10.1.1.648.3459&rep=rep1&type=pdf.

Rematas, Konstantinos, et al., "Soccer on Your Tabletop," Proceedings of the IEEE Conference on Computer Vision and Pattern Recognition. 2018. http://grail.cs.washington.edu/projects/soccer/.

Landabaso, José Luis, and Montse Pardás, "Foreground regions extraction and characterization towards real-time object tracking," International Workshop on Machine Learning for Multimodal Interaction. Springer, Berlin, Heidelberg, 2005. http://landabaso.org/publications/mlmi-05-landabaso.pdf.

Shih, Huang-Chia, "A Survey of Content-Aware Video Analysis for Sports," IEEE Transactions on Circuits and Systems for Video Technology 28.5 (2018): 1212-1231. https://ieeexplore.ieee.org/stamp/stamp.jsp?arnumber=7827117.

"Nokia, AT&T and Jaunt Showcase 5G and Immersive Experiences," Telecom Review, telecomreviewna.com, Nov. 29, 2018. https://web.archive.org/web/20190203205836/http://www.telecomreviewna.com/index.php?option=com_content&view=article&id=2485:nokia-atat-and-jaunt-showcase-5g-and-immersive-experiences&catid=3:newsflash&Itemid=131.

"Immersive sports analysis," Viz Libero, vizrt.com, Feb. 3, 2019. https://web.archive.org/web/20190203205957/https://www.vizrt.com/products/viz-libero/.

Gupta, Abhinav, et al. "Estimating spatial layout of rooms using volumetric reasoning about objects and surfaces." Advances in neural information processing systems, 2010. http://papers.nips.cc/paper/4120-estimating-spatial-layout-of-rooms-using-volumetric-reasoning-about-objects-and-surfaces.pdf.

Jia, Yun-Tao, Shi-Min Hu, and Ralph R. Martin. "Video completion using tracking and fragment merging." The Visual Computer 21.8-10 (2005): 601-610. http://citeseerx.ist.psu.edu/viewdoc/download?doi=10.1.1.166.30&rep=rep1&type=pdf.

Cai, Haoye, et al. "Deep video generation, prediction and completion of human action sequences." Proceedings of the European Conference on Computer Vision (ECCV). 2018. http://openaccess.

(56) References Cited

OTHER PUBLICATIONS thecvf.com/content_ECCV_2018/papers/Chunyan_Bai_Deep_Video_Generation_ECCV_2018_paper.pdf.

Patwardhan, Kedar A., Guillermo Sapiro, and Marcelo Bertalmio. "Video inpainting of occluding and occluded objects." IEEE International Conference on Image Processing 2005. vol. 2. IEEE, 2005. https://www.researchgate.net/profile/Kedar_Palwardhan2/publication/6534338_Video_Inpainting_Under_Constrained_Camera_Motion/links/0c96051e0323d67580000000/Video-Inpainting-Under-Constrained-Camera-Motion.pdf.

Zhang, Yunjun, Jiangjian Xiao, and Mubarak Shaft "Motion layer based object removal in videos." 2005 Seventh IEEE Workshops on Applications of Computer Vision (WACV/MOTION'05)-vol. 1. vol. 1. IEEE, 2005. http://citeseerx.ist.psu.edu/viewdoc/download?doi=10.1.1.75.7244&rep=rep1&type=pdf.

Kang, Kai, et al. "Object detection from video tubelets with convolutional neural networks." Proceedings of the IEEE conference on computer vision and pattern recognition. 2016. http://openaccess.thecvf.com/content_cvpr_2016/papers/Kang_Object_Detection_From_CVPR_2016_paper.pdf.

* cited by examiner

SELECTING SPECTATOR VIEWPOINTS IN VOLUMETRIC VIDEO PRESENTATIONS OF LIVE EVENTS

The present disclosure relates generally to video technology, and relates more particularly to systems, non-transitory computer-readable media, and methods for selecting spectator viewpoints in volumetric video presentations of live events.

BACKGROUND

Volumetric video uses a plurality of cameras to capture up to a 360 degree field of view of a scene. Unlike traditional 360 degree video that is used for applications like virtual reality, gaming, and the like, however, volumetric video is captured from the outside, in. When viewing a volumetric video scene, a viewer may view the scene from any angle (including the middle of the scene), may zoom in or out of the scene, or may view the scene from different perspectives within the scene. The scene may also be viewed in two or three dimensions (e.g., using traditional two-dimensional television displays, three dimensional television displays, head mounted displays, and the like). As such, volumetric video techniques may be used to enhance the viewing experience of live events, such as concerts and sporting events, by making the experience more immersive.

SUMMARY

The present disclosure describes a device, computer-readable medium, and method for selecting spectator viewpoints in volumetric video presentations of live events. In one example, a method includes receiving a plurality of video streams depicting an event occurring in a venue, wherein the plurality of video streams is provided to a processor by a plurality of cameras which are geographically distributed within the venue, identifying an initial position of a target that is present in the venue, based on an analysis of the plurality of video streams, compositing the plurality of video streams to produce a first volumetric video traversal of the live event that follows the target through the venue, predicting a future position of the target in the venue at a future point in time, based in part on a current position of the target, and sending an alert to a display device that is streaming a volumetric video presentation of the event, wherein the alert indicates the future position of the target.

In another example, a non-transitory computer-readable storage medium stores instructions which, when executed by a processor, cause the processor to perform operations. The operations include receiving a plurality of video streams depicting an event occurring in a venue, wherein the plurality of video streams is provided to a processor by a plurality of cameras which are geographically distributed within the venue, identifying an initial position of a target that is present in the venue, based on an analysis of the plurality of video streams, compositing the plurality of video streams to produce a first volumetric video traversal of the live event that follows the target through the venue, predicting a future position of the target in the venue at a future point in time, based in part on a current position of the target, and sending an alert to a display device that is streaming a volumetric video presentation of the event, wherein the alert indicates the future position of the target.

In another example, a system includes a processor deployed in a telecommunication service provider network and a non-transitory computer-readable storage medium stores instructions which, when executed by the processor, cause the processor to perform operations. The operations include receiving a plurality of video streams depicting an event occurring in a venue, wherein the plurality of video streams is provided to a processor by a plurality of cameras which are geographically distributed within the venue, identifying an initial position of a target that is present in the venue, based on an analysis of the plurality of video streams, compositing the plurality of video streams to produce a first volumetric video traversal of the live event that follows the target through the venue, predicting a future position of the target in the venue at a future point in time, based in part on a current position of the target, and sending an alert to a display device that is streaming a volumetric video presentation of the event, wherein the alert indicates the future position of the target.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides systems, non-transitory computer-readable media, and methods for selecting spectator viewpoints in volumetric video presentations of live events. As discussed above, volumetric video techniques may be used to enhance the viewing experience of live events, such as concerts and sporting events, by making the experience more immersive. However, because a volumetric video may be viewed from any angle at any time, and because live events happen in real time (i.e., without prior knowledge of where the most interesting actions may occur), the viewer may miss important actions if he or she is not viewing the scene from the right angle at the right time.

Examples of the present disclosure detect viewpoints that may be of interest to a viewer of a volumetric video presentation of a live event. For instance, examples of the present disclosure may track targets (e.g., individuals, objects, or locations of interest, which may be user-defined) that are depicted in the volumetric video presentation and may predict where in the volumetric video presentation the locations of these targets will be at some future point in time. Further examples of the present disclosure may alert the viewer to viewpoints that will allow the viewer to view targets during predicted periods of action. Thus, for instance, if the viewer is watching a volumetric video presentation of a golf tournament, examples of the present disclosure may track the trajectory of a ball that has been hit and alert the viewer to the location at which the ball is predicted to land.

Within the context of the present disclosure, a "viewpoint" in a volumetric video may comprise a specific combination of viewing angle, degree of magnification (i.e., zoom), and/or perspective. Furthermore, the physical environment or space that is depicted in the volumetric video may be represented in the volumetric video as a plurality of "voxels" having positional coordinates (e.g., X, Y, Z with respect to a reference point), color information (e.g., red, green, blue values and/or cyan, magenta, yellow values), transparency information (e.g., zero to 100 percent), shading information, texture information, and so forth. In one example, the set of information values for respective voxels may change from one frame of the volumetric video to the next, e.g., as objects move through the physical environment (s), as lighting or other environmental conditions change, and so forth.

Furthermore, although examples of the present disclosure are discussed within the context of video that is viewable in 360 degrees, the examples may be equally applicable to video applications whose field of view is less than 360 degrees. For instance, although volumetric video may strive for a 360 degree field of view, in some cases, the actual field of view may be less than 360 degrees.

Figure 1:
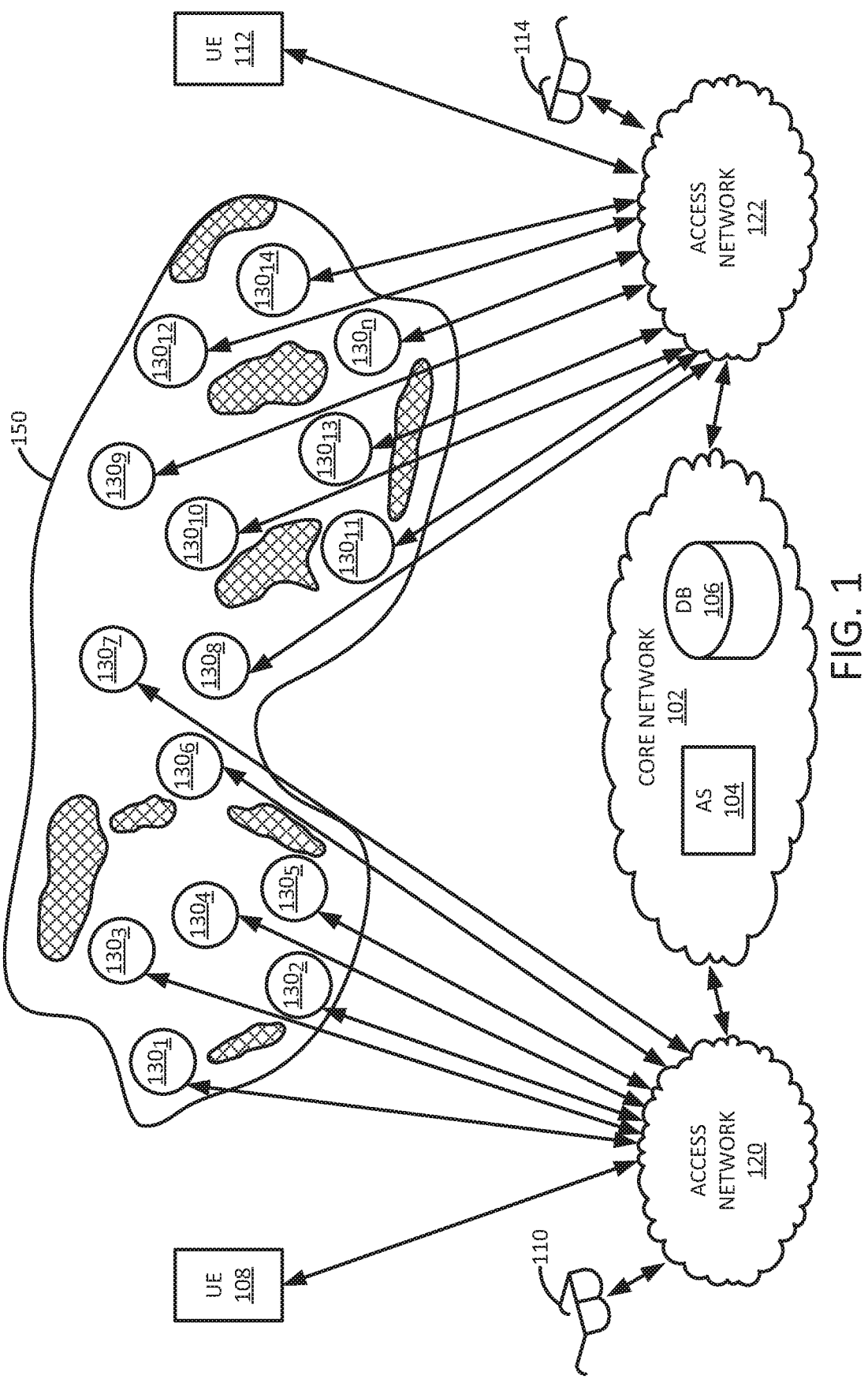
FIG. 1 illustrates an example system in which examples of the present disclosure for selecting spectator viewpoints in volumetric video presentations of live events may operate.

To further aid in understanding the present disclosure, FIG. 1 illustrates an example system 100 in which examples of the present disclosure for selecting spectator viewpoints in volumetric video presentations of live events may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
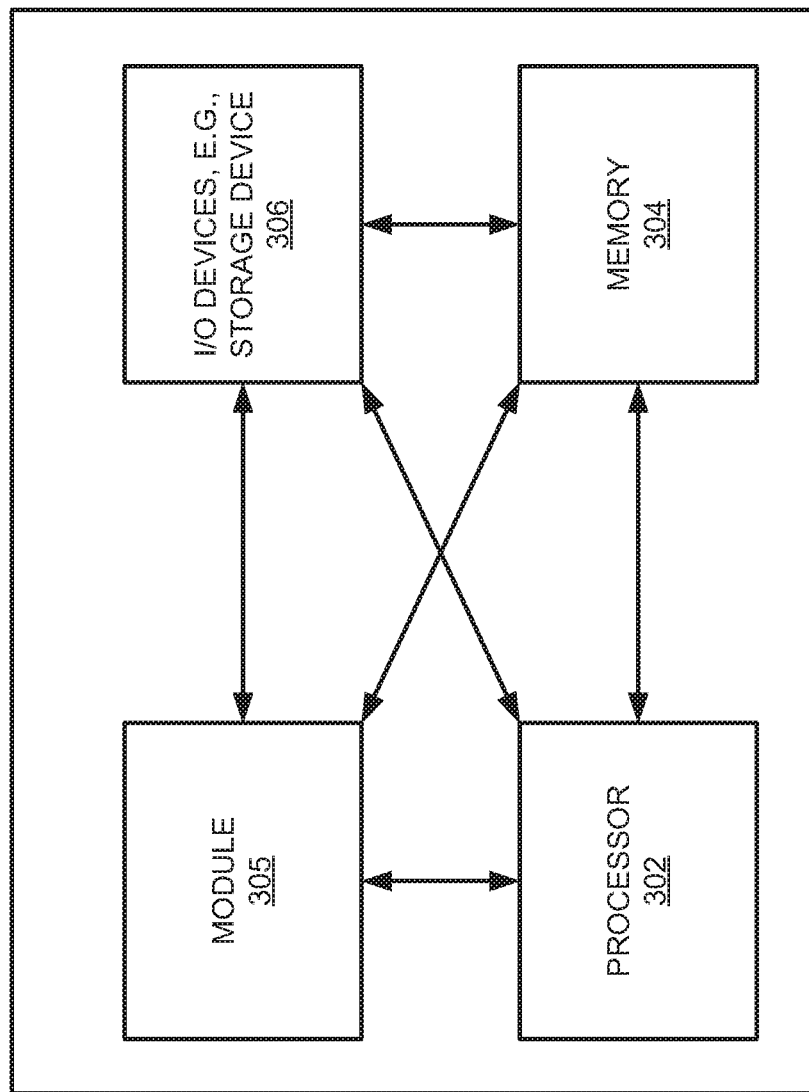
FIG. 3 depicts a high-level block diagram of a computing device specifically programmed to perform the functions described herein.

In accordance with the present disclosure, application server (AS) 104 may comprise a computing system or server, such as computing system 300 depicted in FIG. 3, and may be configured to provide one or more operations or functions for selecting spectator viewpoints in volumetric video presentations of live events, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

The AS 104 may be communicatively coupled to a database (DB) 106. The DB 106 may store data that is used by the AS 104 to perform operations or functions for selecting spectator viewpoints in volumetric video presentations of live events, as described herein. For instance, the DB 106 may store data including profiles of viewers (e.g., network users). The profiles may identify objects, individuals, or locations that are of interest to the viewers (e.g., potential targets to track through volumetric video presentations). These objects, individuals, or locations may include objects, individuals, or locations that the viewers have tracked through previous volumetric video presentations. The DB 106 may also store information about objects, individuals, or locations that may appear in a volumetric video presentation, such as identifying information, physical appearance or characteristics, schedule, statistics, and/or other information. For instance, where the volumetric video presentation comprises a golf tournament, the stored information may include statistics for the participating golfers such as average drive distance, average putts per hole, birdies, etc.

In a further example, the DB 106 may store a library of volumetric videos, a 2D video library, an image library, a plurality of 2D object detection/recognition models (e.g., machine learning-based image detection models), a catalog matching 2D objects to 3D object models, viewer preferences for prioritization of certain objects, topics, and/or regions of focus for rendering volumetric videos, and so forth that may be processed by AS 104 in connection with selecting spectator viewpoints in volumetric video presentations of live events. DB 106 may further store additional information such as a lexicon of topic models, e.g., machine learning-based models to identify topics and/or themes in 2D and/or volumetric video, and so forth.

In a further example, AS 104 may comprise a physical storage device (e.g., a database server), to store various types of information in support of systems for selecting spectator viewpoints in volumetric video presentations of live events, in accordance with the present disclosure. For example, AS 104 may store any or all of the information stored by the DB 106.

Although only a single application server (AS) 104 and a single database (DB) 106 are illustrated in FIG. 1, it should be noted that any number of servers and databases may be deployed. For instance, a plurality of servers and databases may operate in a distributed and/or coordinated manner as a processing system to perform operations for selecting spectator viewpoints in volumetric video presentations of live events, in accordance with the present disclosure. For ease of illustration, various additional elements of network 102 are omitted from FIG. 1.

As referred to herein, a machine learning model (MLM) (or machine learning-based model) may comprise a machine learning algorithm (MLA) that has been "trained" or configured in accordance with input data (e.g., training data) to perform a particular service, e.g., to predict future locations of objects, individuals, or locations in image and/or video content. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a plurality of video capture devices, e.g., two-dimensional and/or three-dimensional cameras, such as cameras 1301-1307. Similarly, access network 122 may be in communication with a plurality of video capture devices, e.g., two-dimensional and/or three-dimensional cameras, such as cameras 1308-130*n*. Hereinafter, the cameras 1301-130*n* may also be referred to individually as a "camera 130" or collectively as "cameras 130." Access networks 120 and 122 may transmit and receive communications between cameras 130 and application server (AS) 104, other components of network 102, devices reachable via the Internet in general, and so forth.

The physical locations of cameras 130 may be geographically distributed within a venue 150. In one example, the venue 150 may be a site having defined boundaries, such as a stadium, a golf course, a park, or the like (in the example illustrated in FIG. 1, for instance, the venue is depicted as a golf course). In one example, the positions of at least some of the cameras 130 within the venue 150 may be fixed. However, in other examples, at least some of the cameras 130 may be mounted to robots, unmanned aerial vehicles (UAVs), or other mechanisms that allow the cameras' positions to be adjusted dynamically. Each camera 130 may be positioned to capture a different perspective (e.g., a different orientations and/or viewpoint) within the venue 150. Some of these perspectives may overlap. Thus, in one example, the cameras 130 may be positioned to collectively provide a 360 degree view of the venue 150. A volumetric video may then be composited from the videos obtained from the cameras 130. For instance, the cameras 130 may feed the respective videos to the AS 104 in network 102 via the access networks 120 and 122.

In one example, the access network 120 may be in further communication with a plurality of user endpoint devices (UEs), such as devices 108 and 110. Similarly, access network 122 may be in further communication with a plurality of user endpoint devices (UEs), such as devices 112 and 114. In one example, UEs 108-114 may each comprise a mobile device, a cellular smart phone, a wearable computing device (e.g., smart glasses, augmented reality glasses, head mounted displays, or headsets), a digital camera, a web-camera, a home-based or business-based security camera, a remote controlled and/or automated drone (with one or more cameras), a personal computer (e.g., a laptop, a tablet computer, a desktop computer, etc.), a bank or cluster of such devices, and the like. In a further example, each of the UEs 108-114 includes or is communicatively coupled to a display that is capable of displaying volumetric video. For instance, UEs 110 and 114 specifically comprise head mounted displays of the type that may be used to view volumetric video presentations. In one example, UEs 108-114 may each comprise programs, logic or instructions for performing functions in connection with examples of the present disclosure for selecting spectator viewpoints in volumetric video presentations of live events. For example, devices 108-114 may each comprise a computing system or device, such as computing system 300 depicted in FIG. 3, and may be configured to provide one or more operations or functions in connection with examples of the present disclosure for selecting spectator viewpoints in volumetric video presentations of live events, as described herein.

In one example, the AS 104 may identify individuals, locations, and/or objects of interest (hereinafter referred to as "targets") depicted in the videos obtained from the cameras 130. The targets may be specified by a viewer of the volumetric video presentation. For instance, where the volumetric video presentation depicts a golf tournament, the viewer may wish to follow a particular golfer, caddy, celebrity spectator, golf ball, or the like. Alternatively, the viewer may wish to view all instances of a certain action, such as putting, driving, clapping, running, or the like. The AS 104 may track the targets through the videos obtained from the cameras 130 and may predict where the targets will be in future frames of the videos. Based on the prediction, the AS 104 may present a particular traversal (e.g., a continuous sequence of viewpoints) through the volumetric video to the viewer, so that the viewer does not miss the opportunity to view action involving the targets. The AS 104 may also present a traversal through the volumetric video in response to a viewer request, where the viewer request identifies the traversal the viewer wishes to see. For example, rather than follow a particular target, the viewer may wish to view the volumetric video from a particular position within the venue. For instance, referring back to the example of the golf tournament, the viewer may wish to view all of the activity at the eighteenth hole, or may wish to view the action from the vantage point of a specific seat in the stands.

Once the traversal is established, a viewer, e.g., via one of the UEs 108-114, may then obtain a presentation of the volumetric video from AS 104 that follows the traversal. For instance, AS 104 may create a two or three dimensional output video, e.g., a projection/traversal of the three dimensional space of the volumetric video, and stream or otherwise transmit the output video to the UEs 108-114. Alternatively, or in addition, the volumetric video may be provided to the UEs 108-114, and the UEs 108-114 may render the volumetric video in accordance with the display capabilities of the UEs 108-114. For example, the viewer may select one or more perspectives, targets, or the like from within the space of the volumetric video (e.g., within the venue 150) from which to render the output video. For instance, a user interface of one of the UEs 108-114 may enable the viewer to move a viewpoint left/right, up/down, forward/backward, etc., to select coordinates or define a position with respect to a reference point in the venue 150, and so forth. The viewpoint could also be moved via an input/output (I/O) device such as a joystick or automatically moved in response to movement of the viewer's gaze or spoken viewer commands. In addition, in a server-based example, the AS 104 may also store the output video that is created. Similarly, the AS 104 may provide the volumetric video or/traversal of the 3D space of the volumetric video to an endpoint device (not shown) for controlling one or more of the cameras 130.

In one example, the AS 104 may make the volumetric video and/or output video available to other viewers. For example, as illustrated in FIG. 1, the UE 110 may comprise a wearable computing device (e.g., a head mounted display) and may present the space of the volumetric video for a first viewer. In one example, UE 114 may communicate via access network 122 to request the volumetric video, to receive the volumetric video, and/or to receive at least a portion of the volumetric video to be used in rendering a portion of the space that is currently within the perspective/view of the viewer using the UE 110, to provide position and orientation information of a view of the viewer using the UE 110 to the AS 104 to determine which portion of the volumetric video to provide, to provide commands to start, stop, pause, resume, etc., (e.g., in an example where the volumetric video is streamed from AS 104), and so forth.

To illustrate, a first viewer using the UE 110 may set a perspective from which to experience the visual contents of the volumetric video. For instance, a user interface of the UE 110 may allow the first user to move a viewpoint left/right, up/down, forward/backward, etc., to select coordinates or define a position with respect to a reference point in the venue 150, and so forth. In one example, the first user may change perspectives by changing a location, e.g., by walking, changing a focus, e.g., by moving his or her head and/or eyes, changing a zoom level via a specific command and/or via eye adjustment, and so on.

Similarly, a second user may obtain and experience the volumetric video, or the output video generated for the first viewer, via the UE 114. For instance, AS 104 may provide the same output video that is transmitted to the UE 110 to the UE 114, at the request of the second viewer. In this way, viewers may share their trajectories through the volumetric video presentation, providing a social dimension to the experience. In such an instance, viewers may annotate the trajectories that they create.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within the venue 150. Thus, these and other modifications are all contemplated within the scope of the present disclosure.

Figure 2:
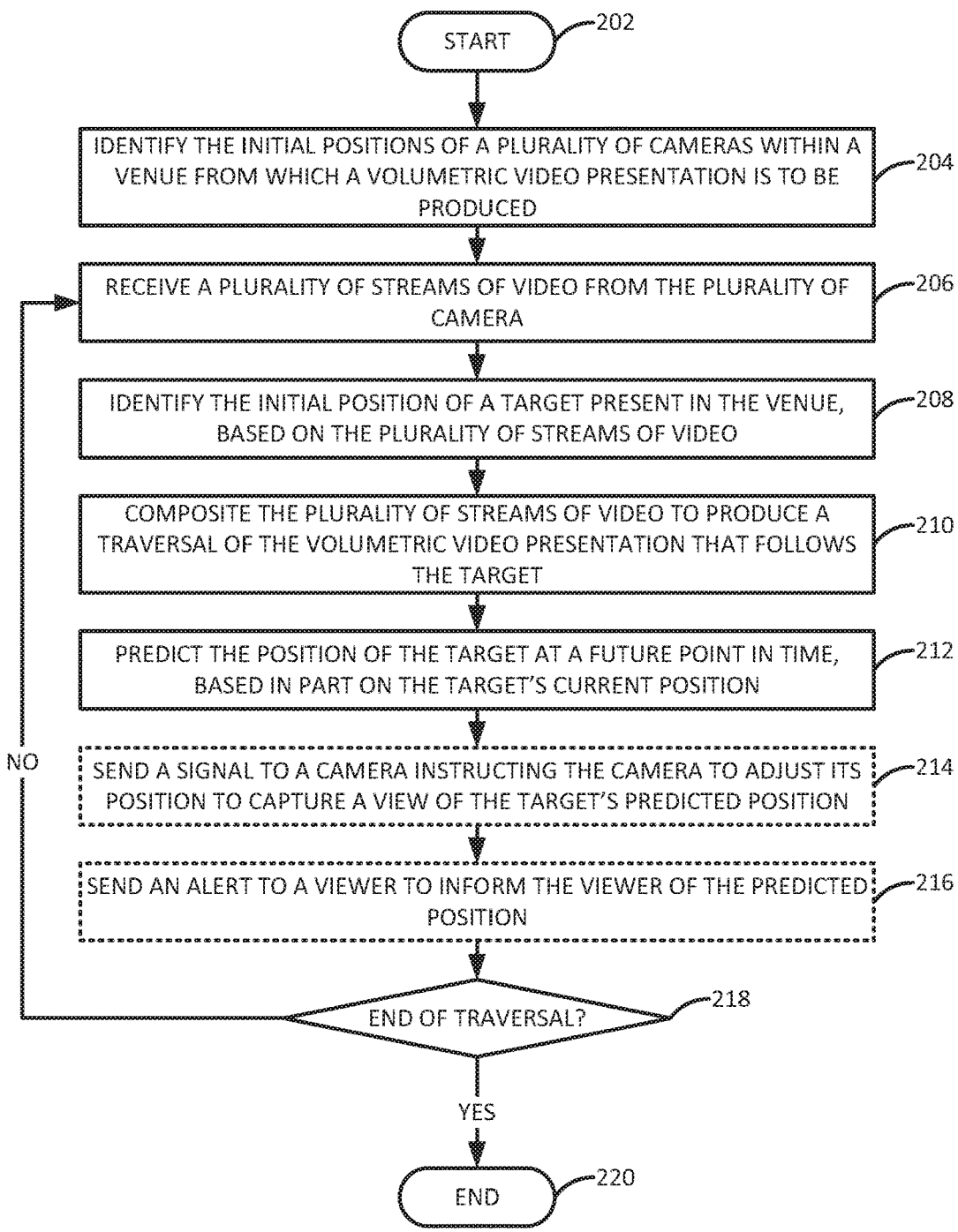
FIG. 2 illustrates a flowchart of an example method for selecting spectator viewpoints in volumetric video presentations of live events.

FIG. 2 illustrates a flowchart of an example method 200 for selecting spectator viewpoints in volumetric video presentations of live events. In one example, the method 200 may be used to track targets appearing the volumetric video presentations when network conditions are stable (e.g., the measured latency does not vary with higher than a threshold standard deviation, where the threshold standard deviation may be, for instance, thirty milliseconds). The steps, functions, or operations of the method 200 may be performed, for example, by the AS 104 and/or one or the wearable UEs 110 or 114 illustrated in FIG. 1. For instance, if a wearable display device has a sufficiently powerful processor, the wearable display device may perform all steps of the method 200. Alternatively, to conserve processing power, the wearable display device may offload some of the more processing intensive steps of the method 200 to a remote application server.

In another example, the steps, functions, or operations of method 200 may be performed by a computing device or system 300, and/or processor 302 as described in connection with FIG. 3 below. Similarly, in one example, the steps, functions, and/or operations of the method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processor, such as processor 302.

The method 200 begins in step 202. In step 204, the processor may identify initial positions of a plurality of cameras within a venue from which a volumetric video presentation is to be produced. For instance, as discussed above, a plurality of cameras may be geographically distributed within a venue, such as a stadium, a golf course, a park, or the like. In one example, the positions of at least some of the cameras within the venue may be fixed. However, in other examples, at least some of the cameras may be mounted to robots, UAVs, tracks, or other mechanisms that allow the cameras' positions to be adjusted dynamically. Each camera may be positioned to capture a different perspective (e.g., a different orientation and/or viewpoint) within the venue, where some of these perspectives may overlap.

In one example, the processor may broadcast a signal that prompts the cameras to send responses including information about their positions (e.g., geographic coordinates, distances from a common reference point, images of respective fields of view, etc.) to the processor. From this information, the processor may be able to determine not only the respective positions of the individual cameras, but also the positions of the cameras relative to each other. This helps the processor to produce a volumetric video presentation, as discussed in further detail below, by properly aligning and compositing the images captured by the plurality of cameras. Knowing the positions of the cameras may also help the processor to track targets through the venue, e.g., by predicting which camera(s) will have a view of the target at a future point in time based on the target's movements.

In step 206, the processor may begin to receive a plurality of feeds from the plurality of cameras. The plurality of feeds may comprise streams of video captured in real time (i.e., as a live event is occurring, subject to any latency introduced by network conditions), where each stream of video depicts a different perspective within the venue.

In step 208, the processor may identify the initial position of a target that is present in the venue, e.g., based on the streams of video received from the cameras. As discussed above, the target may comprise an object, individual, or location whose movements through the venue are to be visually tracked by the cameras. The target may be predefined prior to the processor acquiring the streams of video, for example, by an owner of the venue, or by an individual or organization who is presenting an event taking place in the venue (e.g., an event that is to be presented in volumetric video form). For instance, if the venue is a golf course, volumetric video presentations of events taking place on the golf course may always track the action at the eighteenth hole. Similarly, a professional golf tour presenting a tournament at the golf course may specify that specific popular golfers, or a certain number of the highest-ranked golfers, should always be tracked. In another example, the target could also be defined by a viewer of the volumetric video presentation. For instance, the viewer may wish to follow the movements of a specific caddy or spectator (e.g., a celebrity spectator) through the tournament. Viewer preferences with respect to targets may be identified based on an examination of the viewer's profile (e.g., the profile may list the viewer's favorite targets) or through a direct request from the user (e.g., the viewer may submit a request for the processor to track a specific target). In another example, the target may volunteer to be tracked (e.g., as a spectator who may wish to share his or her viewpoint with friends). In one embodiment, authorizations pertaining to the tracking of targets may have to be received prior to the implementation of tracking. For example, event organizers may have obtained such prior authorizations from the musicians, actors, athletes and the like, who are performing at the events. However, spectators attending the events may not want to be uniquely tracked unless the spectators provide specific authorizations (e.g., opt-in for such tracking, e.g., authorizing a drone with a camera hovering over the spectators and the like). However, in certain scenarios, the spectators may implicitly authorize incidental tracking, e.g., in the example where a tracked ball passes in front of one or more spectators, or a live performer passing in front of a crowd of spectators such as a stage (e.g., authorization is given through the purchase of a ticket for the live events where such incidental capture of the spectators may occur).

The initial position of the target may be identified based on an analysis of the video streams. For instance, object, facial, or text/character recognition techniques may be used to identify the target. As an example, if the target is an individual (i.e., a human target), then facial recognition techniques may be used to analyze the video streams for the presence of the target. If the target is a particular hole of a golf course, text/character recognition techniques may be used to analyze the video streams for the presence of objects (e.g., flags, signage, etc.) displaying the number of the hole. If the target is a vehicle (e.g., a golf cart), object recognition techniques may be used to analyze the video streams for the presence of the vehicle. In other examples, predefined targets may carry tracking devices, such as radio frequency identification (RFID) tags or other devices with unique device identifiers or signatures, that allow the targets to be easily identified in the video streams.

In step 210, the processor may composite the plurality of feeds to produce a traversal of the volumetric video presentation that follows the target. For instance, the processor may employ a mesh-based technique (e.g., in which a static three dimensional mesh representation of the venue may be generated and subsequently enhanced with computer generated techniques), a point-based technique (e.g., in which image data captured by the cameras may be represented as points in a three-dimensional space), a combination of mesh-based and point-based techniques, or other techniques used to produce volumetric video to produce the traversal. In one example, the traversal can be viewed on a user endpoint device as the traversal is being created. The processor may publish a list or menu of traversals of the volumetric video presentation, where a viewer may select any of the published traversals for viewing.

In step 212, the processor may predict the position of the target at some future point in time, based in part on the target's current position. In one example, the future point in time is within some threshold period of time from the current time (e.g., x seconds from the current time). In one example, the position of the target may be predicted based on historical statistics related to the target (e.g., as might be stored in a database). For instance, the target may be a golf ball belonging to a specific golfer. In this case, knowing the average distance of the golfer's drive may allow the processor to predict where the ball will land (within some range) on the golfer's next drive. In another example, the position of the target may be predicted based on patterns that are dynamically learned by the processor. For instance, the processor may compute the average distance of the golfer's drive over a set of observed drives (which may be observed in the course of tracking the golfer and/or the golfer's ball). The processor may also observe how real-time environmental conditions (e.g., wind) may affect the movement of balls.

Prediction of the target's future position may also allow the processor to speed transitions from location to location. For instance, by precomputing and/or caching the target's predicted position, streaming and computation latency may be reduced.

In optional step 214 (illustrated in phantom), the processor may send, in response to the target's predicted position, a signal to at least one camera instructing the camera to adjust its position to capture a view of the target's predicted position at the future point in time. For instance, the processor may instruct a fixed camera to adjust its angle or degree of magnification. The processor may also ask a movable camera (e.g., a camera mounted to a robot, and UAV, a track, or another mechanism) to move to a position where the camera can better capture an image of the target's predicted position. In some cases, there may already be at least one camera capturing a view of the target's predicted position. In such a case, it may not be necessary to move any of the cameras.

In optional step 216 (illustrated in phantom), the processor may send an alert to a viewer (e.g., via a user endpoint device on which the viewer is viewing a traversal of the volumetric video presentation), where the alert informs the viewer of an event that the viewer may wish to view. Knowledge of the event may be based on the target's predicted position, as discussed above. For instance, if the processor has predicted that a ball that has just been hit is likely to be a hole-in-one, then the processor may alert the viewer and provide the viewer with a means (e.g., a hyperlink or other mechanism) to view or "jump to" a traversal that depicts the hole-in-one. In one example, the alert may comprise a visual alert. For instance, a text message could be displayed on the viewer's display device, along with a hyperlink or icon that allows the viewer to change the traversal he or she is currently viewing. Alternatively, an icon representing the traversal on screen could change (e.g., could blink, could change color, etc.). In another example, a dynamic visual alert or highlight (e.g., an overlay in the form of a halo, a shadow, or an outline) may indicate either the changes made by the target or alternate traversals that are currently of interest to the viewer. For instance, without modification of an existing traversal, a newly active target (e.g., a golf player) may be highlighted within the volumetric video presentation. In other examples, the alert may be an audible alert (e.g., a beep or a chime) or a haptic alert (e.g., a remote control or head mounted display may rumble).

In step 218, the processor may determine whether to end the traversal that follows the target. For instance, if the volumetric video presentation depicts an event such as a golf tournament, then the processor may receive a signal from an external source indicating that the event has ended. In another example, the processor may determine that there are no longer any viewers viewing the traversal. In another example where the traversal was created in response to a viewer request, the viewer who requested the traversal may request that the traversal be ended, or may request a different traversal. The processor may also be provided with a predefined time at which to cease presenting the volumetric video presentation.

If the processor determines in step 218 that it is not time to end the traversal, then the method 200 may return to step 206 and proceed as described above. Thus, the processor may continue to present a traversal that follows the target by compositing streams of video from the plurality of cameras.

If, however, the processor determines in step 218 that it is time to end the traversal, then the method 200 may end in step 220.

Thus, the method 200 detects viewpoints that may be of interest to a viewer of a volumetric video presentation of a live event. Targets that are predefined, automatically learned, or dynamically requested by viewers may be tracked through the venue in which the live event takes place. Learned and/or stored information may be used to predict future locations of the targets, so that viewers do not miss events that may be of interest.

In one example, the method 200 may allow for the simultaneous production of a plurality of traversals, where each traversal of the plurality of traversals tracks a different target. For instance, as discussed above, some targets may be predefined by an owner of the venue, or by an individual or organization who is presenting an event taking place in the venue. Some targets may also be learned and dynamically added to a menu of tracked targets by the processor. Other targets may be defined by one or more viewers. Thus, a viewer may also request dynamic creation of a new traversal, if none of the currently available traversals are following the target the viewer wishes to follow.

At any time, a viewer may be able to access a list of all traversals that are currently available for viewing. For instance, the available traversals may be presented as a menu in a graphical user interface (GUI), or may be presented as a graphic overlay on a map of the venue, where the overlay includes an icon for each traversal. In the latter case, each icon may be placed on the map in a position corresponding to a current position of the target being tracked by the corresponding traversal. The viewer may "jump" to the current point of any traversal by selecting the corresponding icon (e.g., by touching the icon on a touch screen display, by looking at the icon, by clicking on the icon with a mouse or remote control, etc.).

In a further example, icons may be visually coded (e.g., color coded, displaying different graphics, etc.) in a manner that may allow a viewer to sort the available traversals. For instance, the viewer may only wish to see the available traversals that track human targets (e.g., golfers or spectators, as opposed to locations, objects, or the like).

In further examples, any viewer-defined traversal may be made available for viewing by other viewers (i.e., viewers other than the viewer who requested the viewer-defined traversal). This may allow viewers to share their traversals with friends, even if the friends are located in remote geographic areas. For instance, a person viewing the volumetric video presentation from the East Coast of the United States may share his viewer-defined traversal with a friend viewing the same volumetric video presentation from the West Coast. In this case, the viewers viewing the same traversal from opposite coasts may be able to take advantage of private multi-modal communications (e.g., voice, text, etc.) to communicate with each other while viewing the traversal. The private multi-modal communications may be carried over communication channels that are separate from any communication channels used to stream the traversal. In one example, when a viewer requests a viewer-defined traversal, the viewer may be given the option to set the viewer-defined traversal to private (e.g., only the viewer requesting the viewer-defined traversal has access), to set the viewer-defined traversal to public (e.g., anyone has access), or to share the viewer-defined traversal with a limited or select group of other viewers (e.g., friends and family, social media connections, etc.).

Further examples of the method 200 could be applied to events that are not live. For instance, the method 200 could be employed to capture and produce a movie that allows subsequent exploration of different positions within the movie (e.g., a director's cut, a fan favorite cut, etc.).

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a wearable display device or an application server could be implemented as illustrated in FIG. 3.

As depicted in FIG. 3, the system 300 comprises a hardware processor element 302, a memory 304, a module 305 for selecting spectator viewpoints in volumetric video presentations of live events, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for selecting spectator viewpoints in volumetric video presentations of live events may include circuitry and/or logic for performing special purpose functions relating to streaming volumetric video content. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for selecting spectator viewpoints in volumetric video presentations of live events (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for selecting spectator viewpoints in volumetric video presentations of live events (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
receiving, by a processor, a plurality of video streams depicting a live event occurring in a venue, wherein the plurality of video streams is provided to the processor by a plurality of cameras which are geographically distributed within the venue;
identifying, by the processor, an initial position of a target that is present in the venue, based on an analysis of the plurality of video streams;
compositing, by the processor, the plurality of video streams to produce a first volumetric video traversal of the live event, wherein the first volumetric video traversal comprises a first continuous sequence of viewpoints of the live event that follows the target through the venue;
predicting, by the processor, a future position of the target in the venue at a future point in time, based in part on a current position of the target;
predicting, by the processor, an occurrence of a future event based on the future position of the target; and
sending, by the processor in response to the predicting the occurrence of the future event, an alert to a display device that is streaming a second volumetric video traversal of the live event comprising a second continuous sequence of viewpoints of the live event that is different from the first continuous sequence of viewpoints of the live event, wherein the alert changes an appearance of the target in the second volumetric video traversal of the live event.

2. The method of claim 1, wherein the live event is occurring in real time with the streaming.

3. The method of claim 1, wherein at least one camera of the plurality of cameras is mounted to a movable mechanism.

4. The method of claim 3, further comprising:
sending, by the processor and in response to the predicting of the future position of the target, a request to the at least one camera, wherein the request asks the at least one camera to move to a position from which the at least one camera is capable of capturing video of the future position at the future point in time.

5. The method of claim 1, wherein the target is an object.

6. The method of claim 1, wherein the target is an individual.

7. The method of claim 1, wherein the target is a location.

8. The method of claim 1, wherein the target is defined prior to the receiving.

9. The method of claim 8, wherein the target is identified in a profile associated with a viewer of the second volumetric video traversal.

10. The method of claim 1, wherein the target is defined after the receiving.

11. The method of claim 10, wherein the target is defined by a request from a viewer of the second volumetric video traversal.

12. The method of claim 11, wherein the viewer is provided with an option to share the first volumetric video traversal with other viewers of the second volumetric video traversal.

13. The method of claim 12, wherein the other viewers comprise all other viewers of the second volumetric video traversal.

14. The method of claim 12, wherein the other viewers comprise a limited set of individuals selected by the viewer.

15. The method of claim 10, wherein the target is learned by the processor, through an observation by the processor of the live event.

16. The method of claim 1, wherein the predicting the future position of the target is further based on historical statistics related to the target.

17. The method of claim 1, wherein the predicting the future position of the target is further based on a pattern that is learned by the processor, through an observation by the processor of the live event.

18. The method of claim 1, wherein the first volumetric video traversal and the second volumetric video traversal are two of a plurality of volumetric video traversals composited by the processor, and wherein each traversal of the plurality of volumetric video traversals follows a different target through the venue.

19. A non-transitory computer-readable storage medium storing instructions which, when executed by a processor, cause the processor to perform operations, the operations comprising:

receiving a plurality of video streams depicting a live event occurring in a venue, wherein the plurality of video streams are provided by a plurality of cameras which are geographically distributed within the venue;

identifying an initial position of a target that is present in the venue, based on an analysis of the plurality of video streams;

compositing the plurality of video streams to produce a volumetric video traversal of the live event, wherein the first volumetric video traversal comprises a first continuous sequence of viewpoints of the live event that follows the target through the venue;

predicting a future position of the target in the venue at a future point in time, based in part on a current position of the target;

predicting an occurrence of a future event based on the future position of the target; and sending, in response to the predicting the occurrence of the future event, an alert to a display device that is streaming a second volumetric video traversal of the live event comprising a second continuous sequence of viewpoints of the live event that is different from the first continuous sequence of viewpoints of the live event, wherein the alert changes an appearance of the target in the second volumetric video traversal of the live event.

20. A system comprising:

a processor deployed in a telecommunication service provider network; and a non-transitory computer-readable medium storing instructions which, when executed by the processor, cause the processor to perform operations, the operations comprising:

receiving a plurality of video streams depicting a live event occurring in a venue, wherein the plurality of video streams are provided to the processor by a plurality of cameras which are geographically distributed within the venue;

identifying an initial position of a target that is present in the venue, based on an analysis of the plurality of video streams;

compositing the plurality of video streams to produce a volumetric video traversal of the live event, wherein the first volumetric video traversal comprises a first continuous sequence of viewpoints of the live event that follows the target through the venue;

predicting a future position of the target in the venue at a future point in time, based in part on a current position of the target;

predicting an occurrence of a future event based on the future position of the target; and sending, in response to the predicting the occurrence of the future event, an alert to a display device that is streaming a second volumetric video traversal of the live event comprising a second continuous sequence of viewpoints of the live event that is different from the first continuous sequence of viewpoints of the live event, wherein the alert changes an appearance of the target in the second volumetric video traversal of the live event.

* * * * *